April 29, 1947.  D. H. WARE  2,419,863
LAMINATED ROTOR FOR DYNAMOELECTRIC MACHINES
Filed May 11, 1944
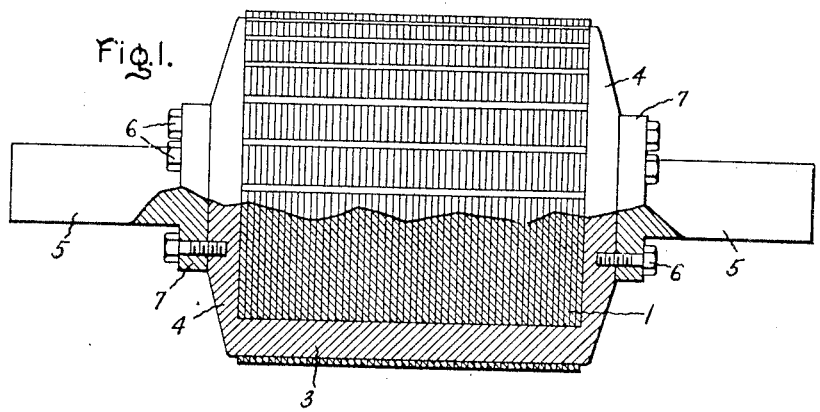
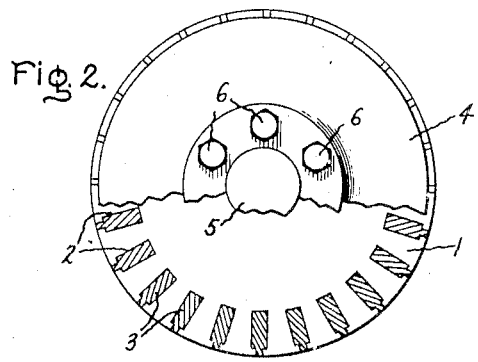
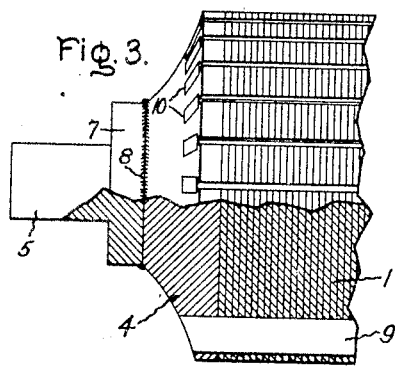
Inventor:
David H. Ware,
by Harry E. Dunham
His Attorney.

Patented Apr. 29, 1947

2,419,863

UNITED STATES PATENT OFFICE 2,419,863

LAMINATED ROTOR FOR DYNAMO-ELECTRIC MACHINES

David H. Ware, Schenectady, N. Y., assignor to General Electric Company, a corporation of New York Application May 11, 1944, Serial No. 535,075

5 Claims. (Cl. 172—120)

1

My invention relates to dynamoelectric machines and in particular to an improved rotatable member for such machines.

An object of my invention is to provide an improved dynamoelectric machine rotatable member.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view, partly broken away, showing an embodiment of my improved dynamoelectric machine rotatable member; Fig. 2 is an end view, partly broken away, of a rotatable member shown in Fig. 1; and Fig. 3 is a side elevational view, partly broken away, showing another embodiment of my invention.

In very high speed rotatable members of dynamoelectric machines, it has been found that the limiting stress in the construction is the hoop-stress in the punchings forming the core and in the end rings of a squirrel cage winding resulting from centrifugal force on the punchings, the end rings, and the squirrel cage winding bars. By making the punchings and end rings or plates centrally imperforate, the hoop stress in the laminations and the end rings may be reduced more than 50 per cent, such that rotors of 40 per cent greater diameter than those with a shaft extending through the punchings can be made for comparable speeds.

Referring to the drawing, I have shown an embodiment of my improved rotatable member provided with a core of magnetic material formed of centrally imperforate thin laminations 1 with a plurality of winding slots 2 formed through the outer peripheral portion of the core. An electrical winding is arranged in the winding slots 2 and is formed of cast squirrel cage bar conductors 3 which are electrically connected and integrally formed with cast short circuiting end plate portions 4 which also are centrally imperforate. Since the end plates 4 are of lower strength than the material of the laminations 1, the outer part of the end plates is made smaller

2 than the central part to reduce the end ring stress further. In order to support the rotatable member, stub shafts 5 are secured to the rotor in any suitable manner without extending through the core laminations 1 or through the end plate portions 4. As shown in Fig. 1, these stub shafts may be secured by a plurality of screws 6 extending through a hub 7 formed on the stub shaft 5 and into the adjacent end plate portions 4. If desired, the stub shaft may be secured directly to the end plate portion 4 by welding, as shown at 8 in Fig. 3. In some instances, it may be found desirable to form the stub shaft in a single piece with the end plate portion, although in most instances it will be found that the shaft should be made of a different material from that of the end plate portions and, therefore, some method of securing the stub shaft to the rotatable member will be found more practical. Furthermore, in some instances, it may be found desirable to form the winding of conductor bars 9 as shown in Fig. 3 which extend through openings 10 formed in the end plates 4 and to braze, weld or otherwise suitably secure the ends of the winding bars 9 to the end plates 4 to provide a good electrical and mechanical connection therebetween.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine rotatable member having a core of magnetic material formed of centrally imperforate thin disk laminations, winding slots in said core, an electrical winding in said winding slots, and supporting means secured to said rotatable member.

2. A dynamoelectric machine rotatable member having a laminated core of magnetic material formed of centrally imperforate disk punchings, winding slots in said core, an electrical winding in said winding slots including conductors in said slots electrically connected to short-circuiting end plate portions, and supporting means secured to said rotatable member.

3. A dynamoelectric machine rotatable member having a core of magnetic material formed of centrally imperforate thin disk laminations, winding slots in said core, an electrical winding in said winding slots including conductors in said slots electrically connected to short-circuiting centrally imperforate end plates, and supporting means including stub shafts secured to said end plates.

4. A dynamoelectric machine rotatable member having a laminated core of magnetic material formed of centrally imperforate disk punchings, winding slots in said core, an electrical winding in said winding slots including conductors cast in said slots and integrally connected to cast short-circuiting centrally imperforate end plate portions, and supporting means including stub shafts secured to said rotatable member.

5. A dynamoelectric machine rotatable member having a core of magnetic material formed of centrally imperforate thin disk laminations, winding slots in said core, an electrical winding in said winding slots including conductors in said slots electrically connected to short-circuiting centrally imperforate end plates, and supporting means secured to said end plates.

DAVID H. WARE.

REFERENCES CITED

The following references are of record in the file of this patent:

UNITED STATES PATENTS

| Number | Name | Date |
|---|---|---|
| 2,067,155 | Levy et al. | Jan. 5, 1937 |
| 2,141,319 | Sato | Dec. 27, 1938 |
| 2,279,402 | Japolsky | Apr. 14, 1942 |
| 2,048,421 | Ballentine | July 21, 1936 |

FOREIGN PATENTS

| Number | Country | Date |
|---|---|---|
| 364,027 | British | Dec. 28, 1931 |
| 12,594 | British | 1910 |
| 523,311 | British | 1940 |